United States Patent [19]

Welte et al.

[11] Patent Number: 5,418,258
[45] Date of Patent: May 23, 1995

[54] PROCESS FOR THE PRODUCTION OF SUBSTANTIALLY CLOSED-CELL RIGID FOAMS CONTAINING URETHANE, UREA AND BIURET GROUPS SHOWING EXCELLENT ADHESION TO SOLID SURFACES AND THEIR USE

[75] Inventors: Rainer Welte, Leverkusen; Hans-Joachim Scholl, Cologne, both of Germany

[73] Assignee: Bayer Aktiengesellschaft, Leverkusen, Germany

[21] Appl. No.: 712,857

[22] Filed: Jun. 10, 1991

[30] Foreign Application Priority Data

Jun. 16, 1990 [DE] Germany ............... 40 19 306.3

[51] Int. Cl.$^6$ ............................................. C08G 18/14
[52] U.S. Cl. ......................................... 521/159; 521/163; 521/170; 521/172; 521/173; 521/174; 521/176
[58] Field of Search ............ 521/159, 163, 170, 172, 521/173, 174, 176, 130

[56] References Cited

U.S. PATENT DOCUMENTS

| 3,846,347 | 11/1974 | Satterly. | |
|---|---|---|---|
| 3,846,348 | 11/1974 | Horst et al. | |
| 3,954,825 | 5/1976 | Touhay, Jr. et al. | 521/159 |
| 3,975,316 | 8/1976 | Villa | 521/159 |
| 4,436,841 | 3/1984 | Rasshofer et al. | 521/120 |
| 4,792,545 | 12/1988 | Takao et al. | 521/159 |
| 4,935,460 | 6/1990 | Cassidy et al. | 521/163 |
| 5,013,766 | 5/1991 | Hanusa | 521/159 |
| 5,064,873 | 11/1991 | Snider et al. | 521/159 |
| 5,102,923 | 4/1992 | Porosoff et al. | 521/159 |

FOREIGN PATENT DOCUMENTS

| 3910100 | 1/1990 | Germany. |
| 986521 | 3/1965 | United Kingdom. |

*Primary Examiner*—John Kight, III
*Assistant Examiner*—John M. Cooney, Jr.
*Attorney, Agent, or Firm*—Joseph C. Gil; Lyndanne M. Whalen

[57] ABSTRACT

Substantially closed-cell rigid foams containing urethane, urea and biuret groups are produced by reacting an NCO terminated prepolymer with a compound having at least two isocyanate-reactive hydrogen atoms and a molecular weight of from about 400 to about 10,000 in the presence of a catalyst and water by any of the known techniques. The NCO terminated prepolymer is the reaction product of x parts by weight of an at least difunctional polyol having an OH value of less than 100 with y parts by weight of an at least difunctional polyisocyanate. The ratio of x to y is at least 1:10. The product foams are particularly useful as insulating materials.

5 Claims, No Drawings

PROCESS FOR THE PRODUCTION OF SUBSTANTIALLY CLOSED-CELL RIGID FOAMS CONTAINING URETHANE, UREA AND BIURET GROUPS SHOWING EXCELLENT ADHESION TO SOLID SURFACES AND THEIR USE

BACKGROUND OF THE INVENTION

This invention relates to a process for the production of substantially closed-cell rigid foams containing urethane, urea and biuret groups, which show excellent adhesion to solid surfaces and to their use as insulating materials and/or for strengthening mechanical structural components.

Processes for the production of substantially closed-cell rigid foams containing urethane, urea and biuret groups are generally known. A review of known processes for the production of such rigid foams can be found, for example, in Kunststoff-Handbuch, Vol. VII, "Polyurethane", edited by R. Vieweg and A. Hochtlen, pages 504 et seq (Carl Hanser Verlag, Munchen 1966).

Substantially closed-cell rigid foams containing urethane, urea and biuret groups are generally produced by reaction of aromatic polyisocyanates with relatively high molecular weight polyols, preferably polyether or polyester polyols, in the presence of blowing agents, catalysts, flameproofing agents and other auxiliaries and additives. It is also known that, instead of polyether or polyester polyols, it is possible to use mixtures of these synthesis components. Such mixtures have been used because the production cost is reduced by mixing expensive polyester polyols suitable for the production of high-quality rigid polyurethane (PU) foams with inexpensive polyether polyols. Suitable low-viscosity polyester polyols for the production of rigid PU foams having favorable mechanical properties are described, for example, German Offenlegungsschrift 2,704,196.

It is also possible to use esters in the form of recycled products of relatively high molecular weight esters. In this case, the esters may also be used as relatively inexpensive components for reducing the cost of the mixtures. These inexpensive esters may be obtained, for example, by glycolysis of high molecular weight dimethyl terephthalate (DMT) polymers or by processing the distillation residues remaining behind in the production of DMT.

By using polyester polyols as the relatively high molecular weight polyhydroxyl compound in the production of rigid foams containing urethane groups, it is possible in particular to improve the flame resistance of the rigid foams and to reduce their brittleness.

In each of the processes mentioned above, fluorocarbon blowing agents are used to ensure that the desirable properties of rigid foams, including for example toughness, adhesion to surface layers and reduced flammability, are obtained.

As can be seen from the comparative Examples infra, rigid foams which have been produced without fluorocarbon blowing agents have significant disadvantages, including brittleness, inflammability and non-adhesion to surface layers.

SUMMARY OF THE INVENTION

It is an object of the present invention to provide a new process for the production of substantially closed-cell rigid foams containing urethane, urea and biuret groups having the combined properties of high toughness with excellent adhesion to a solid surface and reduced flammability.

It is also an object of the present invention to provide a process for the production of substantially closed-cell rigid foams in which conventional formulation constituents are employed with the exception of a fluorocarbon blowing agent.

It is another object of the invention to provide a process for the production of substantially closed-cell rigid foams containing urethane, urea and biuret groups having good mechanical properties without the use of a fluorocarbon blowing agent.

It is a further object of the invention to provide rigid substantially closed-cell foams having urethane, urea and biuret groups having excellent adhesion properties and reduced flammability which are suitable for use as insulating materials and for strengthening mechanical structural components.

These and other objects which will be apparent to those skilled in the art are accomplished by reacting a specific type of NCO terminated prepolymer with a compound containing at least two isocyanate-reactive hydrogen atoms and a molecular weight of from about 400 to about 10,000 in the presence of a catalyst and water. The prepolymer having terminal NCO groups employed in this process is the reaction product of x parts by weight of an at least difunctional polyol having an OH value of less than 100 with y parts of by weight of an at least difunctional polyisocyanate. The ratio of x to y is at least 1:10.

DETAILED DESCRIPTION OF THE INVENTION

The present invention relates to a process for the production of substantially closed-cell rigid foams containing urethane, urea and biuret groups having excellent adhesion to solid surfaces. In this process prepolymers terminated by NCO groups are reacted with compounds containing at least two isocyanate-reactive hydrogen atoms and having a molecular weight of, generally, from about 400 to about 10,000 in the presence of a catalyst and water as blowing agent. Chain-extending and/or crosslinking agents and known auxiliaries and/or additives may optionally be present during this reaction. The NCO prepolymer used is the reaction product of x parts by weight of an at least difunctional polyol with y parts by weight of an at least difunctional polyisocyanate. The ratio of x to y is at least 1:10 and the OH value of the at least difunctional polyol is <100.

The present invention also relates to the use of the substantially closed-cell rigid foams containing urethane, urea and biuret groups having excellent adhesion to solid surfaces produced by this process as insulating materials and/or for strengthening mechanical structural components.

The NCO terminated prepolymers used in the process of the present invention may be prepared from aliphatic, cycloaliphatic, araliphatic, aromatic and heterocyclic polyisocyanates of the type described, for example, by W. Siefken in Justus Liebigs Annalen der Chemie, 362, pages 75 to 136. Examples of suitable isocyanates are those corresponding to the formula

in which
n=2 to 5, preferably 2 to 3 and

Q is an aliphatic hydrocarbon radical containing 2 to 18 and preferably 6 to 10 carbon atoms; a cycloaliphatic hydrocarbon radical containing 4 to 15 and preferably 5 to 10 carbon atoms; an aromatic hydrocarbon radical containing 6 to 15 and preferably 6 to 13 carbon atoms.

Specific examples of suitable polyisocyanates are given in German Offenlegungsschrift 2,832,253, pages 10 to 11.

In general it is particularly preferred to use the commercially readily obtainable polyisocyanates such as 2,4- and 2,6-tolylene diisocyanate, and mixtures of these isomers ("TDI"); polyphenyl polymethylene polyisocyanates of the type produced by phosgenation of aniline-formaldehyde condensates ("crude MDI"); and polyisocyanates containing carbodiimide groups, urethane groups, allophanate groups, isocyanurate groups, urea groups or biuret groups ("modified polyisocyanates"). The modified polyisocyanates derived from 2,4- and/or 2,6-tolylene diisocyanate or from 4,4'- and/or 2,4'-diphenyl methane diisocyanate are particularly preferred.

The other component from which the prepolymer is prepared is a relatively high molecular weight organic compound containing at least two hydroxyl groups. These polyols must have an OH value below 100.

A general review of the materials and techniques used in the production of prepolymers can be found, for example, in Kunststoffhandbuch, "Polyurethane", Vol. 7, edited by Dr. G. Oertel, pages 84–85 (Carl Hanser Verlag, Munchen 1983)

The prepolymers used in the process of the present invention are prepared by known methods with the ratio by weight of polyol to polyisocyanate (i.e., x to y) being at least 1:10 and preferably from 1.5:10 to 2.5:10.

The starting components for the process of the present invention also include compounds containing at least two isocyanate-reactive hydrogen atoms and having a molecular weight of from about 400 to about 10,000. These compounds may contain amino groups, thiol groups or carboxyl groups, but are preferably compounds containing hydroxyl groups, more particularly compounds containing 2 to 8 hydroxyl groups, especially those having a molecular weight in the range of from about 1,000 to about 6,000 and preferably in the range of from about 2,000 to about 6,000. Examples of suitable compounds include polyethers, polyesters, polycarbonates and polyester amides containing at least 2, generally 2 to 8, but preferably 2 to 6 hydroxyl groups known to be useful for the production of homogeneous and cellular polyurethanes. Specific examples of these compounds are given in German Offenlegungsschrift 2,832,253 at pages 11–18.

Any of the known catalysts employed in polyurethane chemistry may be used in the process of the present invention. Diethyl cyclohexylamine is particularly preferred.

Water is used as the blowing agent in the process of the present invention Halogen-free blowing agents such as low-boiling alkanes, alkenes, esters, ketones and ethers may optionally be used as additional blowing agents.

The compound having at least two isocyanate-reactive hydrogen atoms and a molecular weight of from about 400 to about 10,000, catalyst and water are reacted with the prepolymer in quantities such that the index is between and 90 and 150 and preferably between 100 and 130.

Compounds containing at least two isocyanate-reactive hydrogen atoms and having a molecular weight of from 32 to 399 may optionally be used as starting components. These compounds include compounds containing hydroxyl groups and/or amino groups and/or thiol groups and/or carboxyl groups. Compounds containing hydroxyl groups and/or amino groups are preferred. These low molecular weight compounds function as chain-extending agents or crosslinking agents. These compounds generally contain from 2 to 8 and preferably from 2 to 4 isocyanate-reactive hydrogen atoms. Specific examples of chain-extending and crosslinking agents are given in German Offenlegungsschrift 2,832,253 at pages 19–20.

Auxiliaries and additives which may optionally be used in the process of the present invention include: surface-active additives, such as emulsifiers and foam stabilizers; reaction retarders, cell regulators such as paraffins or fatty alcohols or dimethyl polysiloxanes; pigments; dyes; flameproofing agents such as tris-chloroethyl phosphate, tris-chloropropyl phosphate, and tricresyl phosphate; stabilizers against the effects of aging and weathering; plasticizers; fungistatic and bacteriostatic agents; and fillers such as barium sulfate, kieselguhr, carbon black and whiting. Specific examples of these optional auxiliaries and additives are given, for example, in German Offenlegungsschrift 2,732,292 at pages 21–24.

Further examples of surface-active additives and foam stabilizers, cell regulators, reaction retarders, stabilizers, flameproofing agents, plasticizers, dyes, fillers, fungistatic and bacteriostatic agents which may optionally be used in accordance with the invention and details on the use of such additives and the way in which they work can be found in Kunststoff-Handbuch, Vol. VII, edited by Vieweg and Hochtlen, Carl Hanser Verlag, Munchen, 1966, for example on pages 103 to 113.

The substantially closed-cell rigid foams containing urethane, urea and biuret groups and showing excellent adhesion to solid surfaces may be produced by any of the known methods. The rigid foams produced by the process of the present invention preferably have densities of from about 20 to about 200 kg/m$^3$.

Having thus described our invention, the following Examples are given as being illustrative thereof. All parts and percentages given in these. Examples are parts by weight and percentages by weight, unless otherwise indicated.

EXAMPLES

Description of the tests

To evaluate the adhesion of various prepolymers, a 0.8 mm steel plate was placed on the bottom of 20 cm×20 cm×15 cm paper buns and primed with a commercially available epoxy primer. The reaction mixture was poured onto the steel plate at room temperature (20° to 25° C.) and torn off after 1 hour. Adhesion was evaluated in six stages:

1) The steel plate could generally only be removed with considerable force using pliers.
2) The steel plate could only be removed with considerable force and generally not in one piece.
3) The steel plate adhered so firmly that a certain amount of force was required to remove the plate. The steel plate generally separated in one piece after an initial resistance had been overcome.
4) The steel plate could be removed in one piece with little mechanical effort.

5) The steel plate did not drop off before the test, but separated under the slightest mechanical stress.
6) The steel plate had no adhesion and dropped off before the test.

|  | Example 1 | Example 2 (Comp.) | Example 3 | Example 4 | Example 5 | Example 6 (Comp.) |
|---|---|---|---|---|---|---|
| Polyol 1 | 64 | 64 | 64 | 64 | 70 | 70 |
| Polyol 2 | 20 | 20 | 20 | 20 | — | — |
| Stabilizer | 2 | 2 | 2 | 2 | 2 | 2 |
| Catalyst | 0.7 | 0.45 | 0.7 | 0.7 | 0.7 | 0.7 |
| Water | 4 | 4 | 4 | 4 | 4 | 3 |
| Trichloroethyl phosphate | 10 | 10 | 10 | 10 | — | — |
| Prepolymer 1 | — | — | — | — | 200 | — |
| Prepolymer 2 | — | — | — | 219 | — | — |
| Prepolymer 3 | 217 | — | 97.1 | — | — | — |
| Prepolymer 4 | — | 191 | — | — | — | — |
| Isocyanate 1 | — | — | 97.1 | — | — | 140 |
| Isocyanate index | 117 | 114 | 115 | 117 | 104 | 104 |
| Stirring time | 10 | 10 | 10 | 10 | 10 | 10 |
| Latent time | 21 | 24 | 20 | 22 | 22 | 20 |
| Gel time | 187 | 162 | 147 | 182 | 150 | 96 |
| Surface | Tough | Tough | Tough | Tough | Tough | Rubber-glass |
| Interior | Tough | Tough | Tough | Tough | Tough | Tough |
| Cell size | 2 | 2 | 2 | 2 | 2 | 2 |
| Cell structure | 2-3 | 2 | 2-3 | 2-3 | 2 | 2 |
| Adhesion | 1 | 6 | 2 | 1 | 2 | 6 |
| Shrinkage RT | None | Slight | None | None | None | None |
| Density kg/m$^3$ | 45.5 | 37.7 | 42 | 46.2 | 37.3 | 36.5 |

Example 1 illustrates the use of a prepolymer according to the invention to produce a foam with excellent adhesion to the steel plate at 20° to 25° C.

Example 2 (Comparison Example) shows that no adhesion was obtained at room temperature where the prepolymer used does not satisfy the requirements of the present invention.

Example 3 shows that a foam produced using a 1:1 mixture of a prepolymer satisfying the requirements of the present invention with an unmodified isocyanate al so has relatively good properties.

Examples 4 & 5 are further Examples of the use of the prepolymers according to the invention.

Example 6 (Comparison Example) shows that unmodified isocyanate produces a foam which does not adhere to the substrate.

Starting Materials

Polyol 1 Polyprpopylene oxide ether, OH value 530, based on a mixture of ethylene glycol (61% OH), sugar (38% OH) and water (1% OH) as starter and propylene glycol Polyol 2 Polyether, OH value 28, with polypropylene glycol as starter and 87% PO and 13% terminal EO (molecular weight 4010)

Stabilizer B 8421, polyether siloxane, a product of Goldschmidt, Essen

Catalyst diethyl cyclohexylamine

Prepolymer 1 MDI prepolymer of crude MDI (viscosity at 20° C.=100 mPa.s) containing 20% polyether, OH value 56, with propylene glycol as starter and propylene oxide. Viscosity=676 mPa.s, NCO=24.5%.

Prepolymer 2 MDI prepolymer of crude MDI (viscosity at 20° C.=200 mPa.s) containing 20% polyester of adipic acid, hexanediol, neopentyl glycol having an OH value of 28. Viscosity=4500 mPa.s, NCO=24.2%.

Prepolymer 3 MDI prepolymer of crude MDI (viscosity at 20 C.=200 mPa.s) containing 20% polyether, OH value 28, with trimethylol propane as starter and 86% propylene oxide and 14% terminal ethylene oxide. Viscosity=1500 mPa.s, NCO=24.4%.

Prepolymer 4 Isocyanate prepolymer of crude MDI (viscosity at 20 C.=200 mPa.s) and a polyester of adipic acid/phthalic acid and diethylene glycol, OH value 530. Isocyanate content of the prepolymer=27. Viscosity at 24° C.=1,000 mPa.s.

Isocyanate 1 Crude MDI, viscosity at 20° C.=200 mPa.s, NCO=31,5%

The above described components were combined and reacted in the amounts indicated in the Table. The properties of the resultant foams are also reported in the Table.

Although the invention has been described in detail in the foregoing for the purpose of illustration, it is to be understood that such detail is solely for than purpose and that variations can be made therein by those skilled in the art without departing from the spirit and scope of the invention, except as it may be limited by the claims.

What is claimed is:

1. A process for the production of rigid foams containing urethane, urea and biuret groups in which no fluorocarbon blowing agent is employed which foams are characterized by very good adhesion to a solid surface comprising reacting a) a prepolymer having terminal NCO groups which prepolymer is the reaction product of x parts by weight of an at least difunctional polyol having an OH value of less than 100 with y parts by weight of an at least difunctional polyisocyanate where the ratio of x to y is at least 1:10 with b) a compound having at least two isocyanate-reactive hydrogen atoms and a molecular weight of from about 400 to about 10,000 in the presence of c) a catalyst and d) water as a blowing agent.

2. The process of claim 1 in which the reaction is carried out in the presence of (e) at least one agent selected from the group consisting of chain extending agents, crosslinking agents and mixtures thereof.

3. The process of claim 1 in which components b), c) and d) are reacted with the prepolymer a) in amounts such that an isocyanate index of from about 100 to about 300 is achieved.

4. A foam having a density of from about 20 to about 200 kg/m$^3$ produced by the process of claim 1.

5. A process for the production of rigid foam insulating materials and rigid foams for strengthening mechanical structural components comprising reacting
   a) a prepolymer terminated by NCO groups which prepolymer is the reaction product of x parts by weight of an at least difunctional polyol having an OH value of less than 100 with y parts by weight of an at least difunctional polyisocyanate where the ratio of x to y is at least 1:10 with
   b) a compound containing at least two isocyanate-reactive hydrogen atoms and having a molecular weight of from about 400 to about 10,000 in the presence of
   c) a catalyst and
   d) water.

* * * * *